UNITED STATES PATENT OFFICE.

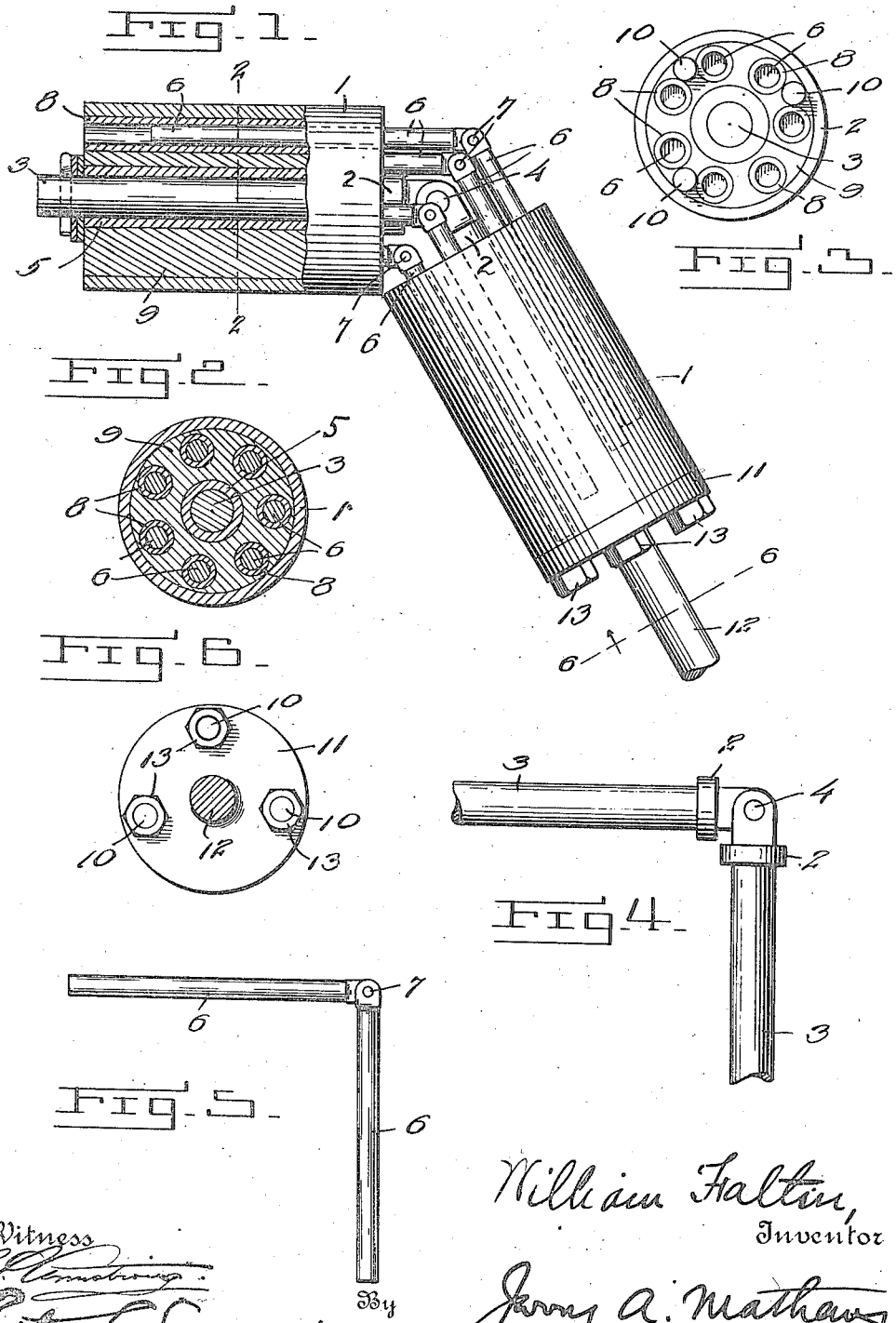

WILLIAM FALTIN, OF FLORENCE, ARIZONA, ASSIGNOR TO LILLIE C. DURHAM, OF RED ROCK, ARIZONA.

SHAFT-COUPLING.

1,166,401.

Specification of Letters Patent.

Patented Dec. 28, 1915.

Application filed July 6, 1915. Serial No. 38,252.

*To all whom it may concern:*

Be it known that I, WILLIAM FALTIN, a citizen of the United States, residing at Florence, in the county of Pinal and State of Arizona, have invented a new and useful Shaft-Coupling, of which the following is a specification.

My invention relates to a shaft coupling, the especial object of my invention being to provide a shaft coupling having a universal joint and which is adapted to noiselessly transmit power from one shaft to another at different angles and also at changeable angles.

It is a further object of my invention to provide means for maintaining respective shaft couplings in a predetermined spaced relation, and to removable bearings or bushes which may be replaced when worn.

It is an object of my invention to provide the novel combination and arrangement of parts more fully hereinafter disclosed, in connection with the accompanying drawings, illustrative of my invention, in which—

Figure 1 is a plan of the invention, shown partly in section; Fig. 2 is a section on line 2—2 of Fig. 1; Fig. 3 is an end view of Fig. 6 with member 11 removed; Fig. 4 is a detail view of the shouldered centerpins; Fig. 5 is a detail view of pivoted pins 6; and Fig. 6 is a view on line 6—6 of Fig. 1.

Similar numerals indicate similar parts throughout the views.

Referring to the accompanying drawings, I provide like shaft couplings 9, having a hardened outer casing 1 for use of belting, a central bush 5, and a plurality of spaced outer bushes 8, as illustrated in Fig. 2. Sliding and revolving in bushes 8 of the respective shaft couplings are adjustable pins 6, pivoted at 7 to permit of adjustment to any desired angle. Center pin 3 is pivoted at 4 to permit of like adjustment. A universal joint shaft coupling is thus provided, the pivoted pins permitting of adjustment to changeable angles. Center pin 3 is provided with annular shoulders 2 to bear against the end of the shaft couplings and reduce friction on the bushes in which pins 6 travel.

I may provide means for connecting the outer end of a shaft coupling to a wheel, and for this purpose employ a plurality of threaded studs 10 extending from the end of the coupling member 9, as illustrated in Fig. 3, to engage in corresponding orifices in plate 11, which is secured by bolts 13, as shown in Fig. 6, center shaft or hub 12 being rigidly secured to plate 11, which in turn is rigidly fastened to the coupling shaft, as above described.

The operation of the device will be readily understood from the accompanying drawings. The pins 6 slide in sequence and revolve about the center pin 3 as the coupling shafts revolve. Shoulders 2 on center pin 3 maintain the coupling shafts in the predetermined spaced relation to each other and reduce friction on the shaft bearings. Bushes 8 are frictionally engaged in the respective coupling shafts and may be removed and replaced when worn. The pivoted connection of the pin members permits of the adjustment of the respective shafts to any angle and to changeable angles, constituting a universal joint shaft coupling. The device is noiseless in operation.

I may provide a secondary form of the invention, adapted only for stationary angles of the respective shafts, in which integral, unpivoted pin members are substituted in place of the pivoted pins of my improved form of coupling hereinbefore described.

The foregoing description of the primary form of my invention applies also to the secondary form, save that in the secondary form the pin members are integral and without pivots, the pin members being cylindrical throughout.

What I claim is:

1. In a universal joint shaft coupling, adjustable shaft coupling members each having a longitudinal central bush and a plurality of longitudinal spaced outer bushes, pivoted center pins revolubly mounted in the central bushes of the respective coupling members and a plurality of pivoted outer pins slidably and revolubly mounted in the respective outer bushes of the coupling members.

2. A universal joint shaft coupling having in combination shaft coupling members each having a central bush and a plurality of spaced outer bushes correspondingly positioned lengthwise of the respective shafts, pivoted center pins revolubly mounted in the central bushes and having annular shoulders adapted to bear against the ends of the respective coupling members to maintain the same in a predetermined spaced relation, and a plurality of spaced pivoted outer pins slidably and revolubly mounted in the outer bushes of the respective coupling members.

3. In a device of the class described, shaft coupling members having hardened outer casings, bushes longitudinally positioned in the respective shaft coupling members one of which is centrally disposed in each coupling member, a pivoted center pin having annular shoulders to engage against the adjacent ends of the respective coupling members to maintain the same in predetermined relation, outer pins slidably and revolubly mounted in the outer bushes of the respective coupling members, and means, rigidly mounted at the outer end of one of the shaft members adapted for securing a hub thereto, substantially as set forth.

WILLIAM FALTIN.

Witnesses:
WALTER WINER,
H. R. STEPHENS.